Dec. 19, 1950     E. C. CHRISTIAN ET AL     2,534,231
CAM GRINDING DEVICE

Filed June 20, 1949     2 Sheets-Sheet 1

INVENTOR.
EDWARD C. CHRISTIAN.
JOHN C. DIEHL.
BY
ATTORNEY.

Dec. 19, 1950     E. C. CHRISTIAN ET AL     2,534,231
CAM GRINDING DEVICE

Filed June 20, 1949     2 Sheets-Sheet 2

INVENTOR.
EDWARD C. CHRISTIAN.
JOHN C. DIEHL.
BY
ATTORNEY.

Patented Dec. 19, 1950

2,534,231

UNITED STATES PATENT OFFICE 2,534,231

CAM GRINDING DEVICE

Edward C. Christian and John C. Diehl,
Philadelphia, Pa.

Application June 20, 1949, Serial No. 100,211

10 Claims. (Cl. 51—232)

(Granted under the act of March 3, 1883, as
amended April 30, 1928; 370 O. G. 757)

This invention relates to new and useful improvements in a cam-grinding device which, when mounted on a grinding machine, enables an operator to grind cam profiles of various shapes and having a proportionate rise or fall in contour as required for cams used in automatic screw machines.

In automatic screw machine operation, it is often necessary to tool up such machines for functions comprising a complete cycle of motions for each "set up" of tools used to make a given product formed from material in the shape of "bar stock," for instance. To give these tools the required motions to perform their necessary cutting functions, cams of various contours are used. These cams are usually rough machined to their approximate shape and size on various cutting machines but, as the final profile of the cam surface is required to be "hardened," it can best be finished by grinding. The various shapes of these cam profiles can be more quickly and more accurately finished on a grinding machine by the cam-grinding device of this invention.

The principal object of this invention is to provide a device that, when used with other machine tools such as grinders and milling machines, will produce a cam profile having a uniform rise or fall per degree of rotation and having a true and accurately machined surface without chatter marks.

Another object is to provide a device having an easily and quickly adjustable sine bar, the setting of which produces the required amount of rise and fall throughout the profile of the curve to be produced and in exactly equal amounts per degree of rotation throughout the surfaces produced.

Still another object is to provide a device in which, with a known desired rise or fall per degree of rotation for a given cam profile, the sine bar adjustment can be made with a micrometer measurement between the positioning block of the device and a pin in the sine bar which will give the desired rise or fall, within the limits of the design, quickly and accurately.

A still further object is to provide a device such that the various motions required to produce cams having large variations in the amount of their rise and fall, from one cam profile to another, are produced by the motion of one handwheel but which can be moved from one or the other of three positions so as to produce the required speeds of operation.

A still further object is to have sliding and rotating parts of this device so protected from grinding dust and dirt that they can be well lubricated and move freely and easily without sticking and without looseness or play, which might cause chatter or uneven operation.

A still further object is to incorporate in this device the principle of the "sine bar" with an adjustable angle, said adjustment controlling the proportionate amount of rise or fall per degree of rotation of a cam contour, as said cam profile is machined, by the means of a block rolling with a transverse motion with respect to a grinding wheel or cutter, on roller bearings, and said block acting as the support for a shaft carrying the cam to be machined.

These and other objects of the invention, and the various features and details of the construction, operation and use thereof, are hereinafter more fully set forth and described with reference to the accompanying drawings in which like numbers refer to like parts and in which.

Figure 1:
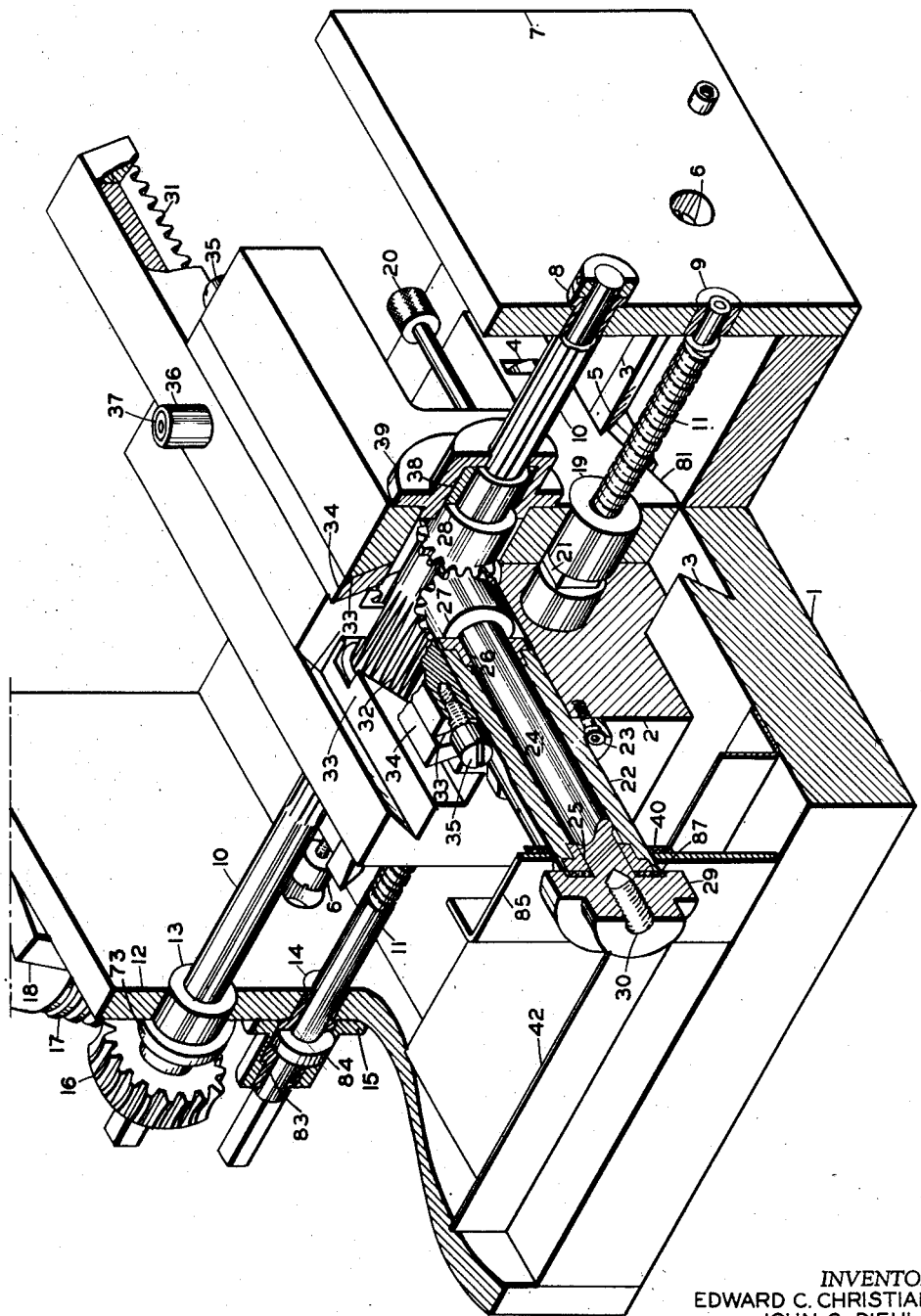
Fig. 1 is an isometric view of the device with portions cut away to show some of the interior mechanism.
Figure 4:
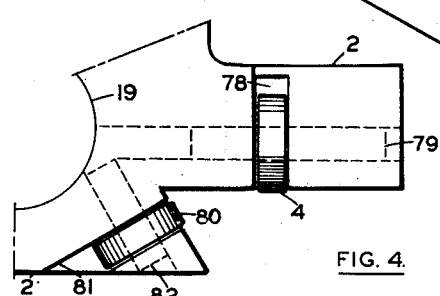
Fig. 4 is a view of two of the eight roller bearings supporting the block in which the shaft supporting the cam and its operating mechanism is housed.

In Fig. 1 there is bedplate 1 on which the block 2 is mounted and moves transversely, being positioned in V-shaped guides shown at 3, said block 2 being supported by and positioned laterally and vertically by eight roller bearings 4 and 80 shown in Fig. 4. Gib 5 is tapered and is wedged endwise by screws 6 and acts as a liner, bearing on the one side against another V-guide 3 and on the other side against two roller bearings 80 located in the block 2. End plate 7 is the support for bushings 8 and 9 in which splined shaft 10 and screw shaft 11 rotate. End plate 12 supports bushing 13 which supports shaft 10 and also bearing 14 supporting shaft 11 and collar 15. Bushings 14 and 83 take the end thrust of shaft 11 on flange 84. Collar 15, which is integral with the flanged support 18, is fastened to end plate 12 by screw 60 and other screws (not shown). Worm gear 16 meshes with worm 17 in flanged support 18 when the latter is shifted into position for worm and gear to engage. Screw shaft 11 is threaded into nut 19 which slides endwise in block 2 except when locked against turning and sliding by pin 20 engaging nut 19 tangentially in slot 21. Pin 20 moves endwise in a hole in block 2 so that by locking nut 19 and then by the rotation of screw 11 block 2 can be moved transversely on bedplate 1.

Bearing retainer 22 is held in block 2 by screws 23 and shaft 24 is supported in bearing retainer 22 by bearings 25 and 26 and is driven by bevel gear 27 meshing with bevel gear 28 mounted on and driven by pinion 32 which is driven by splined shaft 10 or rack 31. Flange 29 is integral with shaft 24 and is the mounting flange for the cam to be ground and which cam is held in place by means of a screw 65 engaging tapped hole 30. Felt washer 87 seals bearings 25 against dirt and dust from the grinding operation. Rack 31 meshes with pinion 32 and moves endwise in V-ways 33 and is positioned laterally by gib 34 which is tapered and can be adjusted endwise in the V-ways to eliminate side play between rack 31 and block 2. Screws 35 are tapped into block 2 and effect adjustment of gib 34.

Roller 36 rotates on pin 37 which has a press fit in rack 31.

Bevel gear 28 is pressed on pinion 32 which is mounted in bearing 38 that is carried in flange 39 which is piloted in and fixed to block 2.

Numeral 40 indicates a felt washer making a dust and dirt seal between cover 85 and bearing retainer 22.

Sheet-metal angle 42 is a support for a portion of the housing (not shown).

Figure 2:
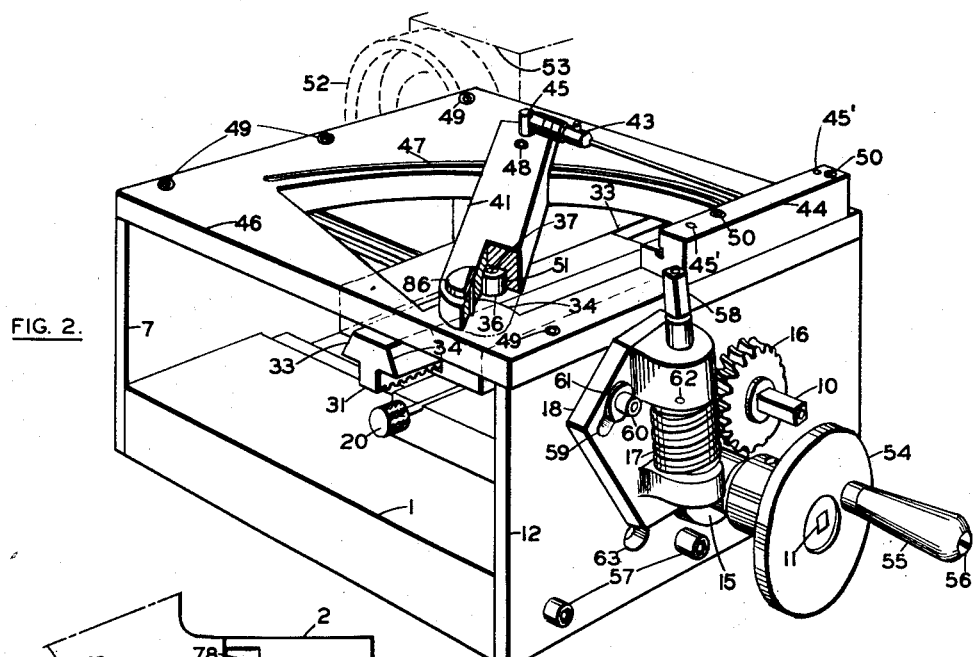
Fig. 2 is a perspective view of the complete device with the covers removed.

In Fig. 2, numeral 41 designates a sine bar which pivots on pin 86 and is adjustable to the required angle, so as to give the desired rise and fall to the profile of the cam being ground. The micrometer 43 is used to set the distance between positioning block 44 and dowel pin 45 located in sine bar 41. Other dowel pins 45' locate positioning block 44.

Top plate 46 is fastened to end plates 7 and 12 by Allen head screws 49 and 50 and positioning block 44 is also secured by screws 50. Sine bar 41 is held at the desired angle, as measured by micrometer 43, by Allen head screw 48 sliding in arc slot 47 in top plate 46 and cooperating with a nut (not shown) on the other side of said slot 47.

Roller 36 rides in track 51 which extends axially in sine bar 41, said roller 36 being positioned and rotating on pin 37 which is secured in rack 31, so that as said rack 31 moves in its V-ways 33, block 2 moves the cam to or from grinding wheel 52 in a direction at right angles to the V-ways. The required rise and fall of the cam profile is obtained by the cam movements relative to the grinding wheel 52 which revolves in and is positioned by wheel head 53. Handwheel 54 mounts on the squared end of screw shaft 11 and revolves said screw shaft 11 by means of handle 55 mounted and turning on spindle 56 screwed into hand wheel 54. End plate 12 fastens to baseplate 1 by Allen headed screws 57.

Handwheel assembly 54 also interchangeably mounts on splined shaft 10 and worm shaft 58 when speed changes are required. Squared shaft 58 carries worm 17 meshing with worm gear 16 giving a speed reduction between shaft 58 and splined shaft 10 of about 16 to 1 with a comparable increase in torque on splined shaft 10.

Worm 17 may be moved into or out of mesh with worm gear 16 by rotating support 18 on shaft 11 and locking said support in position by screw 60 acting against support 18 through washer 61 and in slot 59. This support 18 may be pivotally mounted on plate 12 by a bolt independent of the flange 15 or shaft 11. Numeral 62 designates an oil-hole in support 18 through which to oil the bearing of shaft 58. Hole 63 allows for the adjustment of gib 5 by means of screw 6, Fig. 1.

Figure 3:
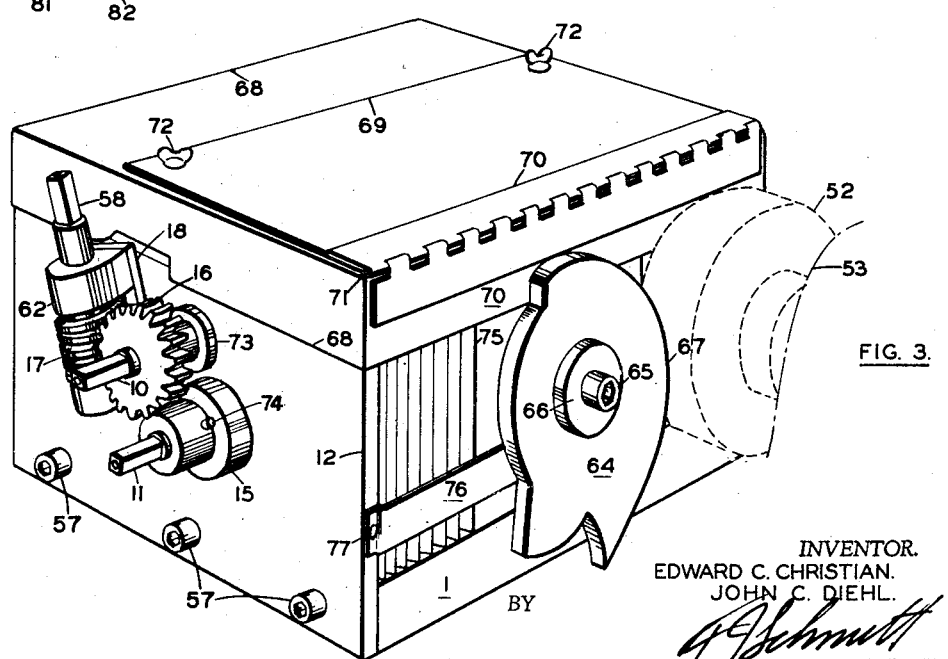
Fig. 3 is a perspective view of the complete device showing a cam mounted on its arbor and the grinding wheel with its support.

In Fig. 3 numeral 64 designates the cam the profile 67 of which is to be ground by grinding wheel 52. Cam 64 is mounted on flange 29 and is held rigidly in place on shaft 24 by Allen head screw 65 through washer plate 66. Said cam 64 rotates and travels with respect to grinding wheel 52 so that these dual motions are maintained when the handwheel 54 is operated. These two motions are held in their required relation by the setting of the angle of sine bar 41. The top cover 68 has an opening, through which the sine bar 41 can be adjusted, and which is closed by a lid 69 hinged by hinge 70 and pin 71 to top cover 68 and locked in the closed position by thumb screws 72. Flange 73 positions splined shaft 10 endwise by bearing against end plate 12. Bearing 83 on the outer end of shaft 11 may be oiled by an oil cup 74 (Fig. 3).

Numeral 75 designates a bellows-shaped cover, which keeps dust and dirt from entering the interior of the device and is retained by strap 76 which is secured by screw 77 to end plate 12 at one end and to end plate 7 at the other end (not shown).

As shown in Fig. 4 roller bearing 4 is held in a slot 78 in block 2 by pin 79 so as to project below the surface of said block 2 and is one of four of such bearings to carry and support block 2 upon bedplate 1. Bearing 80 is located in slot 81 in block 2 and positioned by pin 82 so as to project from the surface of said block 2 and is one of two bearings that contact gib 5 which is tapered and adjustable so as to remove all play both vertical and horizontal between block 2 and its supporting bedplate 1 and at the same time furnishing ball-bearing roller contacts in all directions, between said supporting surfaces.

The mechanism of this invention performs all the necessary operations to grind cams to predetermined contours of rise and fall quickly and accurately by simply positioning the sine bar instead of depending on the skill of the operator.

When the rise of a cam per degree of rotation is known the total rise for any given angle of rotation can be easily computed. Then a simple formula in which the total rise divided by the number of radians in said angle will give the tangent of an angle the sine of which when multiplied by ten, and increased by one, will give the setting distance in inches of the sine bar for the particular design constants of the present device; for example, for a 1.8" total uniform cam rise in a 180° cam angle, the rise per radian would be 1.8÷3.1416 or .57295". This represents the ratio of the desired change in distance of the cam axis from the grinder axis in inches to the change in angular position of the cam about its own axis in radians during the process of grinding. The sine bar must therefore be adjusted to a corresponding angle such that the controlling roller moving in a slot in the sine bar will provide the same ratio of movements at right angles to each other, one of which movements is translated mechanically in the device into motion of the cam toward or away from the grinder with a ratio of 1 to 1 and the other movement is translated through gearing into rotary motion of the cam with a ratio of a unit of length to 10 radians, said unit being equal to the length of the sine bar. Accordingly, $$10 \sin(\tan^{-1} .57295) + 1$$
$$= \left[ 10 \frac{\tan(\tan^{-1} .57295)}{\sqrt{1 + [\tan(\tan^{-1} .57295)]^2}} + 1 \right]$$
$$= 10 \frac{.57295}{\sqrt{1 + (.57295)^2}} + 1$$
$$= 10 \times .49723 + 1$$
$$= 5.9723''$$

This is the setting of the micrometer which was therefore used in obtaining the cam 67 in the present example.

Obviously any other cam rise could be adjusted for in the same manner.

After this "sine bar" setting is made, by use of the micrometer, a cam profile can be ground which will be accurate as to the shape required to make the movements necessary to produce the part desired on an automatic screw machine.

The cam-grinding device of this invention performs the function of grinding cams, having a direct lift ratio, by producing, on the cam being ground, two motions in relation to the grinding wheel. The first motion of said cam is one of rotation, usually in the opposite direction to that of the grinding wheel. The second is a transverse motion perpendicular to the grinding face of the wheel. The two motions are combined to give any desired rise or fall per degree of revolution in the cam being ground.

The relative change between the two motions is regulated by the sine bar setting which may be varied in the angle between itself and the axis of the cam-mounting shaft in the block supporting and carrying the cam against the grinding wheel, said sine bar having an axial track that engages a roller on a bearing slidably mounted in said block parallel to the cam axis.

The two motions of the cam, the surface of which is to be ground to give any predetermined rise or fall per degree of revolution, are obtained by the use of one handwheel operable from any of three different positions on three different shafts through a pair of bevel gears, a nut and screw, a worm and worm-wheel, and a rack and pinion, all three shafts being connected directly or indirectly to the block which carries the cam to be ground. This block is actuated in its motion toward or away from the grinding wheel by a roller fastened to a rack, said rack being actuated by a pinion mounted on a splined shaft driven by the handwheel. Said roller rolls in and is guided by a track in the sine bar and said sine bar, being adjustable as to its angle, governs the amount of rise and fall on the cam being ground.

At the same time that the block is carrying the cam either toward or away from the grinding wheel, the cam is also being revolved by the action of the handwheel through a pair of bevel gears one mounted on the shaft driven by the handwheel and the meshing gear mounted on the shaft carrying the cam to be ground.

In order to slow down the rotation of the splined shaft carrying the bevel driving gear, a worm and gear reduction can be used between the handwheel and said splined shaft. Another optional method of operation of the device is to mount the handwheel on the screw shaft that engages a nut fastened in the block carrying the cam so that as the block is moved transversely, it also moves the roller mounted in the rack which slides in said block and said sliding motion rotates the pinion with which the rack meshes and which is mounted on the splined shaft which then rotates the bevel gear which meshes with the bevel gear on the shaft carrying the cam to be ground.

In order to eliminate as much sliding friction and play between the sliding block and its ways as possible, roller bearings are installed, four in each of two planes, so that two of these bearings bear against a single adjusting gib so as to remove all the play and lost motion between the block and its support without sliding friction.

All of this mechanism is enclosed in suitable covers so that the dust from the grinding wheel is kept away from the sliding surfaces, bearings, etc.

A device such as the one of this invention must be smooth and free in action with little lost motion or back-lash so that a chatter-free surface for the cam profile can be ground and a true contour maintained within the limits of the design.

Cams of uniform motion having lifts of identical amounts, per degree of revolution, can be generated and ground, within the limits of the device, with greater speed and accuracy than with any other known method.

Although the device as described is used as a cam grinder, it can also be used with other machine tools such as, for instance, a milling machine where the profile, of desired shape, can be cut with various types of milling cutters.

The details of construction and application of the device shown herein are descriptive and do not limit the scope of this invention to the exact details of the disclosure. It is intended that the invention is to include everything disclosed and within the scope of the appended claims.

The invention described herein may be manufactured and used by the Government of the United States of America for governmental purposes without the payment of any royalties thereon or therefor.

We claim:

1. In combination with a precision grinding machine, a cam grinding device comprising a base, a block slidably mounted on said base, a cam arbor rotatably mounted in said block at right angles to the sliding direction, means for simultaneously moving said block and rotating said arbor in a predetermined relation to obtain a predetermined rise on the periphery of a cam mounted on said arbor, a pivoted sine bar on said base having a track axially positioned therein and adjustable from a position parallel to said cam arbor to a position approximately at right angles thereto, said last named means comprising means for moving said block on said base, a rack in said block mounted slidably parallel to said cam arbor and having a pin engaged in said sine bar track, whereby said rack is moved in accordance with the angular adjusted position of said sine bar when said block is moved on said base, and mechanism operated by said rack to turn said cam arbor, said pivoted sine bar providing adjustable means for varying said predetermined relation.

2. The combination of claim 1 wherein said mechanism includes a splined shaft mounted on said base and passing through said block parallel to its sliding movement, a pinion splined on said splined shaft and mounted in said block for meshing engagement with said rack, and meshing bevel gears in said block on said cam arbor and splined on said splined shaft, respectively.

3. The combination of claim 2 wherein said splined shaft has a fitting on its end for the application of a hand crank for manual operation of mechanism to provide the simultaneous motion of the block and turning of the cam arbor.

4. The combination of claim 3, a worm wheel on splined shaft, a worm mounted on a movable bracket adjustably fixed to said base in one of two positions to place it either in mesh or out of mesh with said form wheel and having a fitting on its end similar to that on the splined shaft for optionally receiving the hand crank for manual operation of the mechanism at a lower speed and greater torque when desirable.

5. The combination of claim 4, and an additional means for manually moving said block at a different speed and corresponding torque.

6. The combination of claim 5, wherein said additional means comprises a nut slidably mounted in said block in a direction parallel to said splined shaft, and having releasable means for locking it in said block, and a threaded shaft mounted on said base and threaded through said nut, said threaded shaft also having a fitting on its end similar to the others.

7. The combination of claim 6, wherein said base has sides and top for shielding said mechanism from dirt and dust, including an accordion type flexible wall on the side from which the cam arbor protrudes, said arbor being passed through the middle of said wall.

8. The combination of claim 7, wherein V-ways are provided for the slidable movement of the block and the rack.

9. The combination of claim 8, wherein said V-ways are provided with tapered gibs with adjusting set screws for taking up any play.

10. The combination of claim 9, wherein said V-ways are provided with roller bearings to reduce friction between the sliding surfaces.

EDWARD C. CHRISTIAN.
JOHN C. DIEHL.

REFERENCES CITED

The following references are of record in the file of this patent:

UNITED STATES PATENTS

| Number | Name | Date |
|---|---|---|
| 1,478,433 | Harris | Dec. 25, 1923 |
| 2,321,789 | Atherkolt et al. | June 15, 1943 |
| 2,366,993 | Antos | Jan. 9, 1945 |
| 2,386,973 | Mieth | Oct. 16, 1945 |
| 2,436,902 | Rovick | Mar. 2, 1948 |